United States Patent [19]
Absil et al.

[11] Patent Number: 5,457,078
[45] Date of Patent: Oct. 10, 1995

[54] MANUFACTURE OF IMPROVED ZEOLITE BETA CATALYST

[75] Inventors: Robert P. L. Absil, Mantua; Thomas F. Degnan, Moorestown; George H. Hatzikos, Mantua; Jocelyn A. Kowalski, Clarksboro; Thomas Mebrahtu, Voorhees; Grant H. Yokomizo, Edison, all of N.J.

[73] Assignee: Mobil Oil Corporation, Fairfax, Va.

[21] Appl. No.: 158,325

[22] Filed: Nov. 29, 1993

[51] Int. Cl.[6] .............................. B01J 29/06; B01J 27/14
[52] U.S. Cl. .................. 502/68; 502/64; 502/67
[58] Field of Search .................... 502/64, 67, 68

[56] References Cited

U.S. PATENT DOCUMENTS

| | | | |
|---|---|---|---|
| 3,972,832 | 8/1976 | Butter et al. | 252/437 |
| 4,498,975 | 2/1985 | Pine et al. | 208/114 |
| 4,567,152 | 1/1986 | Pine | 502/64 |
| 4,584,091 | 4/1986 | Pine | 208/114 |
| 4,724,066 | 2/1988 | Kirker et al. | 208/114 |
| 4,873,211 | 10/1989 | Walker et al. | 502/64 |
| 5,110,776 | 5/1992 | Chitnis et al. | 502/64 |
| 5,126,298 | 6/1992 | Absil et al. | 502/68 |
| 5,179,054 | 1/1993 | Schipper et al. | 502/67 |
| 5,190,902 | 3/1993 | Demmel | 502/63 |
| 5,194,412 | 3/1993 | Roberie et al. | 502/64 |
| 5,231,064 | 7/1993 | Absil et al. | 502/68 |
| 5,232,579 | 8/1993 | Absil et al. | 208/113 |

*Primary Examiner*—P. Achutamurthy
*Attorney, Agent, or Firm*—A. J. McKillop; D. P. Santini; G. L. Harris

[57] ABSTRACT

A catalyst composition which comprises a crystalline metallosilicate having the structure of zeolite Beta, phosphorus, and a matrix that is substantially free of crystalline aluminum phosphate which has improved resistance to steam deactivation and which has higher cracking activity than analogous catalysts prepared without phosphorus. The crystalline metallosilicate may be used in the as-synthesized form or in the calcined form. Also included is the method to produce the catalyst composition and methods for the use of catalysts prepared by the present method in organic conversion processes. Specific embodiments of the invention involve various techniques for preparation of catalysts containing phosphorus and crystalline metallosilicates having the structure of zeolite Beta. Catalysts prepared according to the method of this invention are useful for organic compound, e.g., hydrocarbon compound, conversion processes. Organic compound conversion processes include cracking, hydrocracking, and transalkylation, among others.

16 Claims, No Drawings

MANUFACTURE OF IMPROVED ZEOLITE BETA CATALYST

FIELD OF THE INVENTION

This invention relates to a catalyst composition comprising a crystalline metallosilicate having the characteristics of zeolite Beta which has an improved catalytic cracking activity and hydrothermal stability. The method for producing the catalyst involves the incorporation of phosphorus with the crystalline metallosilicate, either in the as-synthesized form or in the calcined form. The invention relates to a method for preparing the catalyst, the new catalyst composition, and use of the new catalyst composition in accordance herewith as a catalyst component for organic compound, e.g., hydrocarbon compound, conversion.

BACKGROUND OF THE INVENTION

It is desirable to increase the resistance of zeolite Beta based catalysts to steam, thermal and liquid phase hydrolytic catalytic deactivation. The benefits afforded by the increased stability of zeolite Beta based catalysts due to application of this invention could have immediate impact in the development of improved fluid cracking catalysts.

Zeolite Beta and its preparation are taught in U.S. Pat. No. 3,308,069 (Re. 28,341). U.S. Pat. No. 4,642,226 teaches a method for synthesizing crystals having the structure of zeolite Beta from a reaction mixture comprising dibenzyldimethylammonium ions as directing agent, and the crystals synthesized thereby. Highly silicious zeolite Beta described as having silica-to-alumina ratios within the range of 20–1,000 is disclosed in U.S. Pat. No. 4,923,690. U.S. Pat. No. 5,164,170 discloses a method for synthesizing large crystal size zeolite Beta from a reaction mixture using a directing agent comprising tetraethylammonium compound and including triethanolamine, and the crystals synthesized thereby. U.S. Pat. No. 5,232,579 discloses a method for synthesis of Zeolite Beta using a chelating agent. Zeolite Beta is characterized by a distinctive X-ray pattern which distinguishes it from other known crystalline silicates. The entire contents of the above disclosures are incorporated herein by reference as to description of the zeolite Beta structure and synthesis.

The X-ray diffraction pattern of the crystalline silicate identified as zeolite Beta is shown in U.S. Pat. No. 3,308,069, herein incorporated by reference. It is indicated in U.S. Pat. No. 3,308,069 that appearance and disappearance of certain X-ray lines can be attributed to compositional differences in silicon to aluminum ratios in the sodium form compositions summarized in Table 2 of that reference with interplanar d-spacing (Angstroms) given in terms of intensity for several dried samples of zeolite Beta. Table 3 of U.S. Pat. No. 3,308,069 again shows X-ray diffraction lines for zeolite Beta with certain variations in intensities and line appearance attributed to cation exchange of zeolite Beta. The more significant d-spacing values for exchanged zeolite Beta appear in Table 4 of U.S. Pat. No. 3,308,069 and are as follows:

| Interplanar d-Spacing (Å) |
| --- |
| 11.4 ± 0.2 |
| 7.4 ± 0.2 |
| 6.7 ± 0.2 |
| 4.25 ± 0.1 |
| 3.97 ± 0.1 |
| 3.0 ± 0.1 |
| 2.2 ± 0.1 |

U.S. Pat. No. 4,642,226, incorporated by reference herein, discloses characteristic X-ray diffraction lines as determined by standard techniques and as shown in Table I.

TABLE I

| Interplanar d-Spacing (Å) | Relative Intensity (I/I$_o$) |
| --- | --- |
| 11.5 ± 0.3 | M–S |
| 7.4 ± 0.2 | W |
| 6.6 ± 0.15 | W |
| 4.15 ± 0.1 | W |
| 3.97 ± 0.1 | VS |
| 3.0 ± 0.07 | W |
| 2.05 ± 0.05 | W |

Cracking catalysts for use in petroleum processing generally consist of a zeolitic component and a matrix. The zeolitic material is generally dispersed in an inorganic oxide-type sol or gel matrix material to which one or more clays are added. Because of the need for higher octane gasoline, there has been an emphasis on octane-increasing improvements in cracking catalysts. Octane-enhancing zeolitic fluid cracking catalysts have been reviewed recently by Scherzer, *Catal. Rev. Sci. Eng.*, 31 (3), 215–354 (1989). The matrix components described in the article include natural or modified clays and inorganic oxides such as silica, alumina, silica-alumina, and silica-magnesia. Other inorganic oxides described for matrices are $TiO_2$, $ZrO_2$, $P_2O_5$, and $B_2O_3$.

Cracking catalysts comprising a zeolite and a matrix material containing aluminum phosphate have been described, for example, in U.S. Pat. Nos. 4,873,211 and 4,228,036. Such catalysts comprising a zeolite and an inorganic oxide matrix which contains phosphorus-treated alumina particles are described in U.S. Pat. Nos. 4,567,152 and 4,584,091 and in European Patent Applications 176,150 and 403,141. The treatment of zeolite catalysts with phosphoric acid to provide a phosphorus-containing catalyst is described in U.S. Pat. No. 4,839,319 and 4,498,975.

In U.S. Pat. No. 4,430,199, tricresyl or ammonium hydrogen phosphate is impregnated into a cracking catalyst to improve the tolerance toward poisoning metals. In addition, boron may be added as a passivating agent.

U.S. Pat. No. 5,110,776 discloses a method for preparing FCC catalysts comprising modifying the zeolite, e.g., ZSM-5, with phosphorus. U.S. Pat. No. 5,126,298 discloses manufacture of an FCC catalyst comprising zeolite, e.g., ZSM-5, clay, and phosphorus. Phosphorus treatment has been used on faujasite-based cracking catalysts for metals passivation (see U.S. Pat. Nos. 4,970,183 and 4,430,199); reducing coke make (see U.S. Pat. Nos. 4,567,152; 4,584,091; and 5,082,815); increasing activity (see U.S. Pat. Nos. 4,454,241 and 4,498,975); increasing gasoline selectivity (see U.S. Pat. No. 4,970,183); and increasing steam stability (see U.S. Pat. Nos. 4,765,884 and 4,873,211).

Phosphorus treatment has also been used on zeolite Beta type catalysts (see U.S. Pat. Nos. 5,232,579; 5,231,064; 5,194,412; 5,190,902; 5,179,054; 5,126,298; 4,724,066; and 4,605,637).

As mentioned above, it is desirable to increase the resistance of zeolite Beta based catalysts to steam, thermal, and liquid phase hydrolytic catalytic deactivation. The benefits afforded by application of this invention could have immediate impact in the development of improved fluid cracking catalysts. Other applications where more stable, phosphorus containing zeolite Beta catalysts with higher alpha activities could be of use (e.g., NiMo containing hydrocracking catalysts) are also contemplated.

SUMMARY OF THE INVENTION

An economical and reproducible method is provided for preparing an improved catalyst composition comprising a crystalline metallosilicate having the structure of zeolite Beta, exhibiting valuable catalytic activity and selectivity and other valuable properties. The method comprises combining the appropriate crystalline metallosilicate material, e.g., zeolite of the Beta structure; a matrix or binder material, e.g, a source of silica or clay; source of phosphorus; and, if desired, a source of alumina to form a mixture or slurry. The method then comprises forming catalyst particles from the mixture or slurry product.

This invention involves the incorporation of phosphorus during the preparation of the catalyst composition. In one embodiment, a crystalline metallosilicate having the characteristics of zeolite Beta is impregnated with a water soluble source of phosphorus, non-limiting examples of which are phosphoric acid, ammonium dihydrogen phosphate or ammonium metaphosphate. For example, the phosphorus impregnation may be done using an incipient wetness technique. Subsequently, a matrix or binder precursor is added to allow the catalyst particle to be formed. Catalyst particles are then formed and dried.

In another embodiment, a water soluble source of phosphorus may first be combined with a matrix or binder that does not contain an acid-soluble source of aluminum (e.g., clay, $SiO_2$, $ZrO_2$, among others) and a crystalline metallosilicate having the characteristics of zeolite Beta. An acid-soluble source of aluminum (e.g., pseudoboehmite) can be added after the zeolite has been thoroughly mixed with the matrix or binder. Catalyst particles are then formed and dried.

In a third embodiment, zeolite Beta is combined with a matrix containing an acid-soluble source of aluminum (e.g., pseudoboehmite). The mixture is formed by a conventional method such as spray drying or extrusion. A water soluble source of phosphorus is then added after calcination of the zeolite Beta-matrix combination (e.g., using an incipient wetness technique to add the phosphorus). Catalyst particles are then formed and dried.

The zeolite Beta may be used in this invention either in the "as-synthesized" form (i.e., still containing an organic directing agent) or in the calcined form (i.e., with the organic directing agent removed).

The catalyst particles may be calcined at a temperature of from about 200° C. to about 800° C. for from about 1 minute to about 48 hours. A preferred calcination procedure in accordance herewith would be to provide a calcined product catalyst which retains a trace amount of carbon residue. Therefore, partial calcination within the above conditions, e.g., at lower temperature and/or shorter time, is preferred.

Zeolite Beta catalysts prepared according to these methods are more resistant to steam deactivation than analogous catalysts without phosphorus.

DETAILED DESCRIPTION OF THE INVENTION

The invention presents a new and useful catalyst composition comprising a crystalline metallosilicate having the characteristics of zeolite Beta, phosphorus, and a matrix material, a method for manufacturing the new catalyst composition, and use of the new catalyst composition in accordance herewith as a catalyst component for organic compound, e.g., hydrocarbon compound conversion.

The invention relates to a catalyst composition comprising a crystalline metallosilicate having the characteristics of zeolite Beta, phosphorus, and a matrix that is substantially free of crystalline aluminum phosphate. One feature of this invention is that the phosphorus is distributed over the zeolite or the zeolite and the matrix, in other words, the phosphorus is not confined to the matrix.

More particularly, this invention relates to three embodiments of the above method for manufacturing the improved catalyst composition. One embodiment for manufacturing the catalyst composition of this invention is to modify a crystalline metallosilicate having the characteristics of zeolite Beta by treating the crystalline metallosilicate with a phosphorus containing aqueous solution. For example, the crystalline metallosilicate may be phosphorus treated using an incipient wetness technique. Any water soluble source of phosphorus, such as phosphoric acid, ammonium dihydrogen phosphate, or ammonium metaphosphate, among others, is useful in this invention. Next, the phosphorus modified crystalline metallosilicate is combined with a matrix or binder precursor. Next, catalyst particles are formed by conventional methods (e.g., spray drying or extruding) from the combination of the phosphorus modified crystalline metallosilicate and the matrix or binder precursor. If desired, the catalyst particles may be calcined.

In another embodiment, in a first step, a phosphorus containing aqueous solution is combined with a first matrix or binder precursor that is substantially free of an acid-soluble source of aluminum (nonlimiting examples of which include clay, $SiO_2$, and $ZrO_2$, among others) and a crystalline metallosilicate having the characteristics of zeolite Beta. Then in a second step, a second matrix or binder precursor comprising an acid-soluble source of aluminum (a nonlimiting example of which is pseudoboehmite) is added to the aqueous mixture after the zeolite is thoroughly mixed with the first matrix or binder precursor. Next, the catalyst particle is formed by conventional methods from the aqueous mixture. If desired, the catalyst particle may be calcined after either the first or the second step or both.

In a third embodiment, a crystalline metallosilicate having the characteristics of zeolite Beta is combined with a matrix precursor comprising an acid-soluble source of aluminum (a nonlimiting example of which is pseudoboehmite) to produce a mixture. Particles are formed from the mixture by conventional means (e.g., spray drying or extruding). Then the formed particles are calcined and the calcined particles are modified by treating them with a phosphorus containing aqueous solution (e.g., using an incipient wetness treatment method). Next, the aqueous mixture is formed and dried by conventional methods to form catalyst particles. If desired, the catalyst particles may be calcined.

An advantage of the above method for preparation of the catalyst composition is that the contact between the crystalline metallosilicate and the phosphorus compound is effective to impregnate the metallosilicate with phosphorus without substantially altering the crystal structure of the metallosilicate. A further advantage of the above method is that the contact between the phosphorus solution and any alumina present in the matrix may be minimized.

The catalyst composition may be calcined at a temperature of from about 200° C. to about 800° C. for from about 1 minute to about 48 hours. The calcined catalyst will have an alpha value of greater than about 50 after it has been converted to the active (i.e., hydrogen) form via, for example, ammonium exchange and calcination. A preferred calcination procedure in accordance herewith would be to provide a calcined product catalyst which retains a trace amount of carbon residue. Therefore, partial calcination within the above conditions, e.g., at lower temperature and/or shorter time, is preferred.

The crystalline metallosilicate having the characteristics of zeolite Beta may be used in its "as synthesized" form. In other words, the zeolite may be used while it still contains an organic directing agent and other organic agents used in synthesis of the crystalline metallosilicate. Alternatively, the crystalline metallosilicate may be used in its calcined (i.e., organic free) form.

The source of phosphorous useful in the present invention comprises a phosphorous containing compound selected from ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof. More specific examples include phosphoric acid and ammonium dihydrogen phosphate.

The present catalytic compositions will catalyze organic conversion reactions such as cracking, hydrocracking, olefin and wax isomerization, aromatic transalkylation and other conversion reactions using hydrocarbon feeds of varying molecular sizes. The present catalytic composition is particularly useful for reactions in which the molecular weight of the feed is reduced to a lower value, i.e., to reactions involving cracking such as cracking or hydrocracking. Therefore, feedstock comprising hydrocarbon compounds is converted to product comprising hydrocarbon compounds of lower molecular weight than the feedstock by contacting the feedstock at conversion conditions with a catalyst comprising the present crystalline material. Cracking may be conducted at a temperature of from about 200° C. to about 800° C., a pressure of from about atmospheric pressure to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 hr$^{-1}$ to about 100 hr$^{-1}$ with a hydrogen/hydrocarbon molar ratio of from about 0.1 to about 100.

The catalytic process can be either fixed bed, moving bed, transfer line, or fluidized bed, and the hydrocarbon flow may be either concurrent or countercurrent to the catalyst flow. The process of the invention is particularly applicable to the Fluid Catalytic Cracking (FCC) or Thermofor Catalytic Cracking (TCC) processes. In both of these processes, the hydrocarbon feed and catalyst are passed through a reactor and the catalyst is regenerated. The two processes differ substantially in the size of the catalyst particles and in the engineering contact and transfer which is at least partially a function of catalyst size.

The TCC process is a moving bed and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated.

Typical TCC conversion conditions include an average reactor temperature of from about 450° C. to about 540° C.; catalyst/oil volume ratio of from about 2 to about 7; reactor volume hourly space velocity of from about 1 to about 5 vol./hr./vol.; and recycle to fresh feed ratio of from 0 to about 0.5 (volume).

The process of the invention is also applicable to Fluid Catalytic Cracking. In fluidized catalytic cracking processes, the catalyst is a fine powder of about 10 to 200 microns. This powder is generally suspended in the feed and propelled upward in a reaction zone. A relatively heavy hydrocarbon feedstock, e.g., a gas oil, is admixed with a suitable cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

The FCC conversion conditions include a riser top temperature of from about 500° C. to about 595° C., specifically from about 510° C. to about 565° C., and most specifically from about 515° C. to about 550° C.; catalyst/oil weight ratio of from about 3 to about 12, specifically from about 4 to about 11, and most specifically from about 5 to about 10; and catalyst residence time of from about 0.5 to about 15 seconds, specifically from about 1 to about 10 seconds.

It is generally necessary that the catalysts be resistant to mechanical attrition, that is, the formation of fines which are small particles, e.g., less than 20 μm. The cycles of cracking and regeneration at high flow rates and temperatures, such as in an FCC process, have a tendency to break down the catalyst into fines, as compared with an average diameter of catalyst particles of about 60–100 microns. In an FCC process, catalyst particles range from about 10 to about 200 microns, preferably from about 20 to 150 microns. Excessive generation of catalyst fines increases the refiner's catalyst costs.

The feedstock, that is, the hydrocarbons to be cracked, may include in whole or in part, a gas oil (e.g., light, medium, or heavy gas oil) having an initial boiling point above about 204° C., a 50% point of at least about 260° C., and an end point of at least about 315° C. The feedstock may also include deep cut gas oil, vacuum gas oil, thermal oil, residual oil, cycle stock, whole top crude, tar sand oil, shale oil, synthetic fuel, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils having an end point of up to about 700° C., even with high metals contents, can also be cracked using the invention.

Because these catalytic compositions have been found to be stable, their use as cracking catalysts, e.g., in fluid catalytic cracking processes, with resid feeds will represent an especially favorable mode of utilization. Still further, they may be used in combination with one or more other catalyst components such as, for example, cracking catalysts comprising silica-alumina and/or zeolite Y, e.g., USY.

It is conventional to use an additive catalyst with different properties along with a conventional catalyst to form an optional mixed catalyst system. The catalyst composition of this invention may be combined with other large-pore zeolites, e.g., zeolites X, Y, ultrastable Y (USY), rare earth exchanged Y (REY), and rare earth exchanged ultrastable Y (RE-USY) among others. The catalyst composition of this invention may also be combined with shape-selective zeolites, e.g., zeolites ZSM-5, ZSM-11, ZSM-12, and ZSM-22, among others. These large-pore and shape-selective zeolites are referred to herein as molecular sieve catalysts.

Although neither the cracking catalyst nor the additive catalyst need be steamed prior to use in the present process, and, in fact, are typically not steamed prior to use herein, they may be steamed at a temperature of from about 300° C. to about 800° C. for a time of from about 1 to about 200 hours in about 5 to about 100% steam.

Either or both the crystalline material and the large-pore or shape-selective material may be composited with another material which is resistant to the temperatures and other conditions employed in the organic conversion process of this invention. Such materials include active and inactive materials and other synthetic or naturally occurring porous crystalline molecular sieves, such as zeolites, as well as inorganic materials such as clays and/or oxides such as alumina, silica or silica-alumina. The latter may be either naturally occurring or in the form of gelatinous precipitates or gels including mixtures of silica and metal oxides. Use of a material in conjunction with the zeolite, i.e., combined therewith or present during its synthesis, which itself is catalytically active may change the conversion and/or selectivity of the catalyst.

Naturally occurring clays which can be composited with either or both catalyst components herein include the montmorillonite and kaolin family, which families include the subbentonites, and the kaolins commonly known as Dixie, McNamee, Georgia, and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, either or both catalyst components can be composited with one or more porous matrix materials such as silica, alumina, silica-alumina, silica-magnesia, silica-zirconia, silica-thoria, silica-berylia, silica-titania, as well as ternary oxide compositions such as silica-alumina-thoria, silica-alumina-zirconia, silica-alumina-magnesia, silica-magnesia-zirconia, and the like. It may also be advantageous to provide at least a part of the foregoing matrix materials in colloidal form so as to facilitate extrusion of the bound catalyst component(s).

The relative proportions of catalyst component(s) and matrix can vary widely with the content of the former ranging from about 1 to about 95 percent by weight, and more usually from about 10 to about 70 weight percent, of the composite. The large-pore or shape-selective crystalline cracking catalyst component and the zeolite Beta component can be independently composited with the same or different matrix material or both materials can be incorporated together in the same matrix material.

The amount of zeolite Beta catalyst component which is added to the large-pore or shape-selective crystalline cracking catalyst component can be fairly small since the presence of even minor quantities of zeolite Beta in the combination catalyst can result in substantial octane gains. The exact weight percent of zeolite Beta relative to the total quantity of catalyst component may vary from cracking unit to cracking unit depending upon the desired octane number, total gasoline yield required, the nature of the available feedstock and other similar factors. For many cracking operations, the weight percent of zeolite Beta relative to the total quantity of catalyst composition can range from about 0.01 to about 50, specifically from about 0.1 to about 25, and more specifically from about 0.5 to about 10.

EXAMPLES

The following examples are presented to illustrate the unique attributes of phosphorus modified zeolite Beta catalysts prepared according to this invention.

Catalysts of this invention and comparative catalysts were prepared and tested to determine the alpha value ($\alpha$) of the catalysts. When alpha value is examined, it is noted that the alpha value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an alpha of 1 (rate constant is 0.016 sec$^{-1}$). The alpha test is described in U.S. Pat. No. 3,354,078; in the *Journal of Catalysis*, Vol. 4, p 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395. The higher alpha values correspond to a more active catalyst.

EXAMPLE 1

A series of phosphorus modified zeolite Beta catalysts was prepared by calcining a powdered sample of zeolite Beta, prepared according to the method of U.S. Pat. 3,308,069, in $N_2$ for 3 hours at 900° F. followed by calcination in air for 3 hours at 1,000° F. This powdered catalyst was then impregnated with an aqueous ammonium dihydrogen phosphate solution by incipient wetness to produce phosphorus loadings of 1 wt. %. The resulting catalyst was then calcined in air at 1,000° F. for 3 or 10 hours. The alpha values of the catalysts were measured and are shown below:

| Sample Designation | Phosphorus Content, Wt. % | Calcination Temp, °F. | Time, Hr | Alpha |
|---|---|---|---|---|
| Sample A | 0 | 1,000 | 3 | 452 |

-continued

| Sample Designation | Phosphorus Content, Wt. % | Calcination Temp, °F. | Time, Hr | Alpha |
|---|---|---|---|---|
| Sample B | 1 | 1,000 | 3 | 440 |
| Sample C | 1 | 1,000 | 10 | 552 |

This example shows that the incorporation of phosphorus does not reduce the alpha activity of calcined zeolite Beta catalysts (alpha values of 440 and 452 are statistically equivalent within the variability of the test, ±5%). In fact, for catalysts calcined for an extended period of time, phosphorus actually improves the alpha activity.

EXAMPLE 2

A series of zeolite Beta catalysts was prepared by extruding the as-synthesized form (i.e., tetraethylammonium cation form) of zeolite Beta crystal used in Example 1 with pseudoboehmite (LaRoche Versal 250, alpha alumina monohydrate, LaRoche Chemical, Baton Rouge, La.). These extrudates were calcined in $N_2$ for 3 hours at 900° F. followed by calcination in air for 3 hours at 1,000° F. The extrudates were then impregnated with an aqueous ammonium dihydrogen phosphate solution by incipient wetness to produce phosphorus loadings ranging from 2 to 10 wt. %. The resulting catalysts were calcined at either 1,000° F. or 1,400° F. for 3 hours. The alpha values of these catalysts were measured and are shown below:

| Sample Designation | Phosphorus Content, Wt. % | Calcination Temperature, °F. | Alpha |
|---|---|---|---|
| Sample D | 0 | 1,000 | 193 |
| Sample E | 2 | 1,000 | 190 |
| Sample F | 5 | 1,000 | 190 |
| Sample G | 10 | 1,000 | 192 |
| Sample H | 0 | 1,400 | 57 |
| Sample I | 2 | 1,400 | 66 |
| Sample J | 5 | 1,400 | 79 |
| Sample K | 10 | 1,400 | 70 |

This example shows that the incorporation of phosphorus does not reduce the alpha activity of calcined alumina bound zeolite Beta catalysts. In fact, for the higher temperature calcined catalysts, phosphorus actually improves the alpha activity relative to the phosphorus-free, high temperature calcined zeolite Beta catalyst.

EXAMPLE 3

A series of phosphorus modified ZSM-5 catalysts was prepared by adding an aqueous solution of ammonium dihydrogen phosphate to a mixture of an as-synthesized (i.e., organic directing agent containing) commercially available ZSM-5 powder (Mobil Oil Co., Beaumont, Tex., Mobil Crystal No. 1) and powdered pseudoboehmite (LaRoche Versal 250, alpha alumina monohydrate) to form an extrudable paste. Ammonium dihydrogen phosphate concentrations were varied to produce phosphorus loadings ranging from 2 to 10 wt. %. The material was extruded to produce 1/16-inch cylinders, dried, and calcined in $N_2$ for 3 hours at 900° F. followed by calcination in air for 3 hours at 1,000° F. The resulting catalysts were then calcined at either 1,000° F. or 1,400° F. for 3 hours. The alpha values of these catalysts were measured and are shown below:

| Sample Designation | Phosphorus Content, Wt. % | Calcination Temperature, °F. | Alpha |
|---|---|---|---|
| Sample L | 0 | 1,000 | 327 |
| Sample M | 2 | 1,000 | 332 |
| Sample N | 5 | 1,000 | 392 |
| Sample O | 10 | 1,000 | 331 |
| Sample P | 0 | 1,400 | 215 |
| Sample Q | 2 | 1,400 | 244 |
| Sample R | 5 | 1,400 | 76 |
| Sample S | 10 | 1,400 | 56 |

This example shows that the incorporation of phosphorus into a mixture of pseudoboehmite and ZSM-5 does not affect the alpha activity of the ZSM-5 catalyst providing the calcination temperature is low enough (i.e., <1000° F.). However, the phosphorus does reduce the alpha of ZSM-5 catalysts calcined at higher temperatures, particularly for catalysts containing more than 2 wt. % phosphorus.

EXAMPLE 4

A phosphorus modified catalyst containing the as-synthesized form of zeolite Beta (i.e., tetraethylammonium cation form) used in Example 1 was prepared by first blending kaolin clay (Kaopaque 10S, a Georgia kaolin from Dry Branch Kaolin Co., Dry Branch, Ga.) and a slurry of zeolite Beta. The slurry of zeolite Beta was prepared by ball-milling (16 hours at 16% solids in a porcelain ball mill) the zeolite Beta and water, to which 0.6 wt. % of a dispersant was added (Marasperse N-22, Reed-Lignin, Inc., Greenwich, Conn.). To the zeolite and clay slurry, sufficient phosphoric acid was added to produce a phosphorus level of 2.4 wt. % on the finished catalyst. A silica-alumina binder was then added to the slurry by first adding colloidal silica (Nalco 1034A, Nalco Chemical Co., Chicago, Ill.) and then alumina (Condea Pural, pseudoboehmite alumina, SB III, Condea Chemie GMBH, Hamburg, Germany) peptized with formic acid. The resulting slurry was spray dried at a spray dryer (Niro, Columbia, Md.) outlet temperature of 360° F. The spray dried material was calcined in $N_2$ for 3 hours at 900° F., then calcined in air for 3 hours at 1,000° F. The alpha value of this catalyst was measured and is shown below:

| Sample Designation | Phosphorus Content, Wt. % | Calcination Temperature, °F. | Alpha |
|---|---|---|---|
| Sample T | 2.4 | 1,000 | 207 |

EXAMPLE 5

A zeolite Beta catalyst was prepared by the same procedure described in Example 4 except that no phosphorus compound was added. This catalyst was prepared by blending a slurry of the same ball-milled as-synthesized zeolite Beta used in Example 4 (i.e., tetraethylammonium cation form) with clay (Kaopaque 10S, a Georgia kaolin). The slurry of zeolite Beta was prepared by ball-milling (16 hours at 16% solids) the zeolite Beta and water to which 0.6 wt. % of a dispersant was added (Marasperse N-22). A silica-alumina binder was then added to the slurry by first adding colloidal silica (Nalco 1034A) and then alumina (Condea Pural, pseudoboehmite alumina, peptized with formic acid). The resulting slurry was spray dried at an outlet temperature of 360° F. The spray dried material was calcined in $N_2$ for 3 hours at 900° F., then calcined in air for 3 hours at 1,000° F. The alpha value of this catalyst was measured and is shown below:

| Sample Designation | Phosphorus Content, Wt. % | Calcination Temperature, °F. | Alpha |
|---|---|---|---|
| Sample U | 0 | 1,000 | 188 |

In conjunction with Example 4, this example shows that the incorporation of phosphorus does not reduce, and actually improves the alpha activity of the calcined zeolite Beta catalyst.

EXAMPLE 6

A series of phosphorus modified zeolite Beta catalysts was prepared by calcining a powdered sample of the same zeolite Beta used in Example 1 in $N_2$ for 3 hours at 950° F. followed by calcining in air for 3 hours at 1,000° F. This powdered catalyst was then impregnated with an aqueous ammonium dihydrogen phosphate solution by incipient wetness to produce a phosphorus loading of 1 wt. %. The resulting catalyst was then calcined at 1,000° F. for 3 or 10 hours and treated in 100% steam at 1,025° F. at atmospheric pressure for 2, 5, 10, or 24 hours. The alpha values of these steamed catalysts were measured and are shown below:

| Sample Designation | Steaming Time, Hrs | Phosphorus Content, wt. % | Calcination Time, Hr | Alpha |
|---|---|---|---|---|
| Sample V | 2 | 0 | 3 | 150 |
| Sample W | 2 | 1 | 3 | 190 |
| Sample X | 2 | 1 | 10 | 224 |
| Sample Y | 5 | 0 | 3 | 79 |
| Sample Z | 5 | 1 | 3 | 121 |
| Sample AA | 5 | 1 | 10 | 188 |
| Sample BB | 10 | 0 | 3 | 44 |
| Sample CC | 10 | 1 | 3 | 139 |
| Sample DD | 10 | 1 | 10 | 177 |
| Sample EE | 24 | 0 | 3 | 29 |
| Sample FF | 24 | 1 | 3 | 80 |
| Sample GG | 24 | 1 | 10 | 144 |

This example shows that the incorporation of phosphorus improves the resistance of zeolite Beta to hydrothermal deactivation. It also shows that samples that are calcined for longer periods prior to steaming have enhanced stability.

EXAMPLE 7

Three identical samples of the calcined catalyst of Example 4 were treated in 100% steam at 1,000° F. at atmospheric pressure for either 2, 5, or 10 hours. The alpha values of the resulting steamed catalysts were measured and are shown below:

| Sample Designation | Steaming Time, Hrs | Phosphorus Content, wt. % | Alpha |
|---|---|---|---|
| Sample HH | 2 | 2.4 | 94 |
| Sample II | 5 | 2.4 | 71 |
| Sample JJ | 10 | 2.4 | 80 |

EXAMPLE 8

Three identical samples of the calcined catalyst of Example 5 were treated in 100% steam at 1,000° F. at atmospheric pressure for either 2, 5, or 10 hours. The alpha values of the resulting steamed catalysts were measured and are shown below:

| Sample Designation | Steaming Time, Hrs | Phosphorus Content, wt. % | Alpha |
|---|---|---|---|
| Sample KK | 2 | 0 | 52 |
| Sample LL | 5 | 0 | 56 |
| Sample MM | 10 | 0 | 45 |

A comparison of the alpha values presented in Examples 7 and 8 show that the incorporation of phosphorus improves the steam stability of the cracking activity of the fluid zeolite Beta catalyst.

EXAMPLE 9

A zeolite Beta catalyst containing (on basis of weight) 25% zeolite Beta, 45.3% silica, 3.4% alumina, and 26.3% kaolin was prepared in accordance with the following method.

Two batches of the same zeolite Beta used in Example 1 weighing 538 grams (76.78% solids) were each mixed with 2.5 grams of a dispersant (Marasperse N-22) and 714 grams of deionized (DI) water. Each batch was ball-milled in a one-gallon ball mill containing 7.8 lbs of ½ inch agate stones. After 16 hours of ball-milling, 813 ml of DI rinse water was added to each ball mill. In a separate vessel, 910.3 grams of kaolin clay (Georgia Kaolin Co. Inc., Elizabeth, N.J., 86.51% solids) was mixed with 4,722 grams of sodium silicate obtained as N-Clear (PQ Corp., Valley Forge, Pa.) containing nominally 28.8% $SiO_2$, 8.8% $Na_2O$, and mixed with 49.1 pounds of DI water. The resulting slurry was successively neutralized by addition of 440.6 grams of 96.9% sulfuric acid and 6.84 lbs of aluminum sulfate (General Chemicals Co., Morristown N.J.) as a solution containing 106.07 grams of $Al_2O_3$. The ball-milled zeolite was added to this slurry. The slurry was dewatered, reslurried, homogenized and spray dried.

The spray dried catalyst was ammonium exchanged with 5 cc of 1N $NH_4NO_3$ per gram of catalyst, washed with 10 cc of DI water per gram of catalyst and dried at 250° F. The resulting catalyst is identified as catalyst NN.

EXAMPLE 10

A phosphorus modified zeolite Beta catalyst was prepared by adding phosphoric acid to kaolin clay (Georgia Kaolin Co.) at a pH of 1.4. A slurry of the same zeolite Beta used in Example 1 was prepared by ball-milling (16 hours at 33% solids) the zeolite Beta and deionized water to which 0.6 wt. % (dry basis) of a dispersant was added (Marasperse N-22). The zeolite slurry was added to the phosphorus treated clay and the resulting slurry was mixed for 15 minutes. The pH of the resulting slurry was 1.5. The solids content of the slurry was adjusted to 25 wt. % using deionized water and the slurry was spray dried to yield a catalyst containing about 15 wt. % zeolite Beta in a 78.1 wt. % kaolin and 6.9 wt. % $P_2O_5$ matrix. The catalyst was calcined in air for 3 hours at 1,200° F. This catalyst is identified as Catalyst OO.

EXAMPLE 11

A control catalyst used in the present study was a rare earth Y type zeolite (REY) catalyst removed from a commercial FCC unit following oxidative regeneration and is designated Catalyst PP.

EXAMPLE 12

Catalyst NN was steam deactivated at 1,450° F. for 10 hours in 45% steam/55% air at atmospheric pressure. The steamed catalyst is designated QQ and was blended with the commercial REY catalyst, Catalyst PP, in proportions to yield 3 wt. % zeolite Beta in the resulting catalyst. The resulting catalyst which contains Beta, REY and is substantially phosphorus free is designated Catalyst RR.

EXAMPLE 13

Catalyst OO was steam deactivated at 1,450° F. for 10 hours in 45% steam/55% air at atmospheric pressure. The steamed catalyst is designated SS and was blended with the commercial REY catalyst, Catalyst PP, in proportions to yield 3 wt. % zeolite Beta in the resulting catalyst. The resulting catalyst which contains Beta, REY and phosphorus is designated Catalyst TT.

Catalysts PP, RR, and TT were tested to determine catalytic performance in a fixed fluidized bed unit at 960° F. to crack a sour heavy gas oil over a range of catalyst/oil ratios. Properties of the sour heavy gas oil are shown in Table II. Results of the testing were interpolated to a 65 vol. % conversion level and are shown in Table III.

TABLE II

| Charge Stock Property | Sour Heavy Gas Oil |
|---|---|
| Pour point, °F. | 90 |
| CCR, wt. % | 0.54 |
| Kinematic viscosity, cs @ 100 C | 8.50 |
| Aniline point, °F. | 170.5 |
| Bromine number | 8.7 |
| Carbon, wt. % | 85.1 |
| Hydrogen, wt. % | 12.1 |
| Sulfur, wt. % | 2.4 |
| Nitrogen, wt. % | 0.41 |
| Basic nitrogen, ppm | 382 |
| Nickel, ppm | 0.3 |
| Vanadium, ppm | 0.4 |
| Iron, ppm | 0.3 |
| Sodium, ppm | 1.3 |

TABLE III

Effect of Beta with Phosphorus on Catalytic Performance
Yield Shifts at 65 vol. % conversion

| | Control | Delta Yields | |
|---|---|---|---|
| Catalyst | PP | RR | TT |
| Zeolite | REY | Beta/REY | Beta/REY |
| Additive Phosphorus, wt. % | — | — | 3 |
| Percent Beta in Blend, wt. % | 0% | 3 | 3 |
| $C_5^+$, Gasoline, wt. % | 42.1 | (1.2) | (5.1) |
| $C_4$'s, wt. % | 7.9 | 0.3 | 3.5 |
| $C_1-C_3$'s, wt. % | 7.6 | 0.7 | 1.5 |
| Coke, wt. % | 4.7 | (0.1) | (0.1) |
| $C_3^=$, vol. % | 6.6 | 0.4 | 2.3 |
| $C_4^=$, vol. % | 6.2 | 0.3 | 3.0 |
| $iC_4$, vol. % | 5.2 | 0.4 | 2.5 |
| RON, $C_5^+$ Gasoline | 91.0 | 1.0 | 2.6 |

( ) denotes a negative value

While there have been described what are presently believed to be typical embodiments of the invention, those skilled in the art will realize that changes and modifications may be made thereto without departing from the spirit of the invention and it is intended to claim all such changes and modifications as fall within the true scope of the invention.

We claim:

1. A method for manufacturing a catalyst composition comprising:
   (a) a first step of combining an aqueous solution of a phosphorus containing compound with a first matrix precursor and zeolite Beta, said first matrix precursor being substantially free of an acid-soluble source of aluminum;
   (b) a second step of adding a second matrix precursor comprising an acid-soluble source of aluminum to the product of the first step; and
   (c) recovering the catalyst composition by forming and drying catalyst particles from the product of the second step.

2. A method according to claim 1 further comprising calcining the formed catalyst particles.

3. A method according to claim 1 wherein the first matrix precursor comprises kaolin clay.

4. A method according to claim 1 wherein the second matrix precursor comprises pseudoboehmite alumina.

5. A method according to claim 1 wherein at least one of the first or the second matrix precursors comprise colloidal silica.

6. The catalyst composition produced by the method of claim 1.

7. The method according to claim 1 wherein the first matrix precursor is selected from the group consisting of a source of silica, clay, a source of zirconia, and combinations thereof and the second matrix precursor further comprises a source of silica.

8. The method according to claim 7 wherein the second matrix precursor consists of the source of acid-soluble aluminum and the source of silica.

9. The method according to claim 8 wherein the first matrix precursor consists of kaolin clay and the second matrix precursor consists of pseudoboehmite alumina and colloidal silica.

10. The method according to claim 1 wherein the first matrix precursor comprises clay and the second matrix precursor comprises pseudoboehmite alumina and a source of silica.

11. The method according to claim 10 wherein the source of silica consists of colloidal silica.

12. The method according to claim 1 wherein the catalyst composition contains about 25 weight percent of the zeolite Beta based upon the dried catalyst composition.

13. The method according to claim 1 wherein the catalyst composition contains about 50 weight percent of the zeolite Beta based upon the dried catalyst composition.

14. The method according to claim 1 wherein the phosphorus containing compound is selected from the group consisting of ammonium metaphosphate, ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof.

15. A catalyst composition comprising a phosphorus modified zeolite Beta and a matrix that is substantially free of crystalline aluminum phosphate, the catalyst composition being prepared by the steps of:
- (a) combining an aqueous solution of a phosphorus containing compound with a first matrix precursor and zeolite Beta, the first matrix precursor being substantially free of an acid-soluble source of aluminum, the first matrix precursor comprising clay;
- (b) adding a second matrix precursor comprising an acid-soluble source of aluminum and comprising a source of silica to the product of step (a); and
- (c) recovering the catalyst composition by forming and drying catalyst particles from the product of step (b).

16. The catalyst composition of step 15 wherein the clay of step (a) consists of kaolin clay and wherein the acid-soluble source of aluminum of step (b) consists of pseudoboehmite alumina and wherein the source of silica of step (b) consists of colloidal silica.

* * * * *